July 20, 1926. Re. 16,388
P. EDLICH
APPARATUS FOR FINISHING TEXTILE FABRICS AND THE LIKE
Original Filed Feb. 27, 1922 2 Sheets-Sheet 1
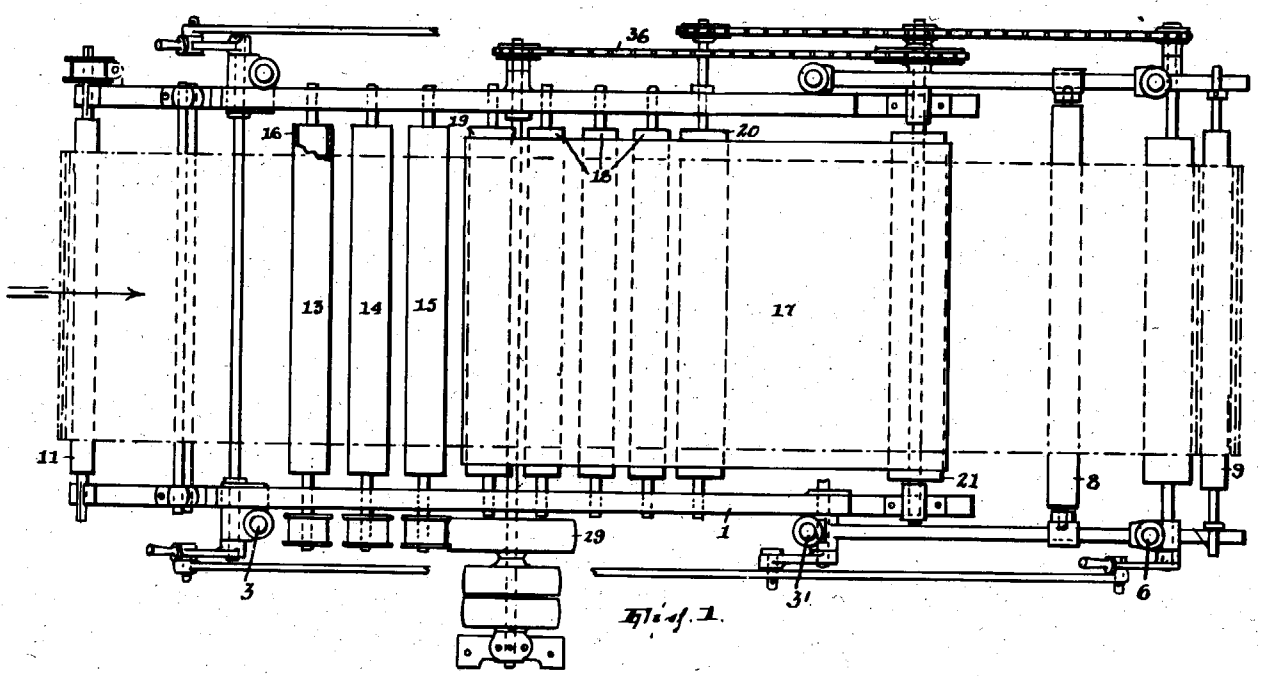
WITNESS
Wm. Bell.
INVENTOR,
Paul Edlich,
BY
John Pennward.
ATTORNEY July 20, 1926.
P. EDLICH
Re. 16,388
APPARATUS FOR FINISHING TEXTILE FABRICS AND THE LIKE
Original Filed Feb. 27, 1922 2 Sheets-Sheet 2
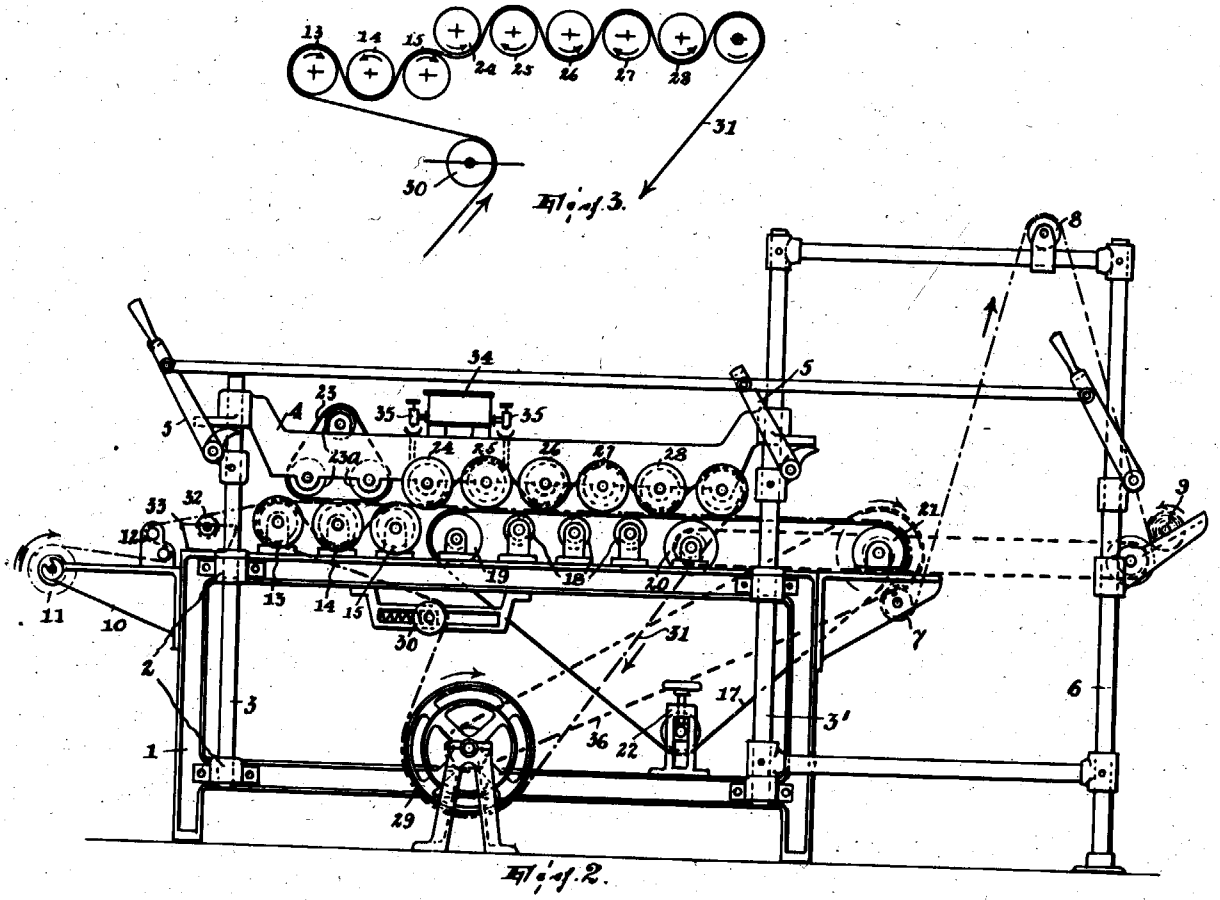
WITNESS
Wm. V. Bell
INVENTOR,
Paul Edlich,
by John Sinnard
ATTORNEY Reissued July 20, 1926. Re. 16,388

UNITED STATES PATENT OFFICE.

PAUL EDLICH, OF DELAWANNA, NEW JERSEY.

APPARATUS FOR FINISHING TEXTILE FABRICS AND THE LIKE.

Original No. 1,471,551, dated October 23, 1923, Serial No. 539,529, filed February 27, 1922. Application for reissue filed March 26, 1925. Serial No. 18,639.

The principal object of this invention is to provide an improved fabric rubbing machine for imparting a finish to fabrics and especially fabrics requiring the higher grade of finish and its application to both faces of the fabric. In carrying out my invention I had had in mind that to accomplish this object provision should be made for rubbing in opposite directions on the same face of the fabric, for yieldingly supporting the fabric while being rubbed, for adjustability of the rubbing pressure, and for other conditions as will appear in the following description.

In the drawings:—

Fig. 1 is a plan view of a preferred form of my machine with the frame 4, but with parts carried thereby and other parts removed;

Fig. 2 is a side elevation thereof; and

Fig. 3 is a diagram showing the mode of driving certain parts of the mechanism.

Referring to the figures, numeral 1 designates the stationary frame, which is provided with side brackets 2 in which guide supports 3 and 3′ are provided for an adjustable frame 4.

The adjustable frame 4 rests upon manually operable adjusting means indicated at 5 of any convenient construction.

Extending from the guide support 3′ is another stationary frame 6, serving as suspension for the guides 7 and 8 and the wind-up 9 for the finished goods.

Extending from the opposite side of the stationary frame is a bracket 10, supporting a roll of unfinished goods, indicated at 11 and tension means indicated at 12.

On top of the stationary frame is mounted a series of rollers 13, 14 and 15, which are preferably covered with a resilient material, as for instance, felt velvet or plush, indicated at 16 in Fig. 1. Also mounted upon this stationary frame is an adjustable apron indicated at 17, supported by a series of rollers 18, 19 and 20 and driven by the rollers 19, 20 and 21. By means of a take-up indicated at 22, the apron 17 may be stretched or slackened.

Mounted upon rollers 23ª on the adjustable frame 4, there is a similar travelling apron 23 provided, which is disposed opposite the roller series 13, 14 and 15, and so arranged that its yieldable portion faces the middle roller 14. Adjacent the apron 23 and on frame 4 there is another series of resiliently covered rollers 24, 25, 26, 27, and 28, facing the spaces between the rollers 19, 20 and the rollers 18 for the adjustable apron 17.

Thus there are two sets of rubbing means, one adjustable toward and from the other, each set including rubbing devices and a yielding opposer (17 or 23) and each having its rubbing devices cooperating with the opposer of the other set, whereby both sides of the fabric are adapted to be rubbed at once.

A driving mechanism indicated at 29 is adapted to rotate through a chain 36 the end roller 21 of the adjustable apron 17 and also through a belt 31 the lower and the upper series of rollers, as shown in Fig. 3. A take-up indicated at 30 for the driving means 31, transmitting motion to the roller series, permits the various adjustments of the roller series toward their respective aprons; that is, it permits the frame 4 to rise and fall, carrying apron 23 and roller series 24—25—26—27—28 from or toward roller series 13—14—15 and apron 17 which are arranged in the main frame 1, having for this purpose a spring, as shown in Fig. 2.

The apron 23 is not driven, but simply affords a yielding opposer to roller 14; the apron 17 affords a yielding opposer to rollers 24 to 28, and it is driven for the purpose of drawing the fabric through the machine.

As will be noted from the diagram in Fig. 3, roller 13 in the first series turns in clockwise direction, roller 14 in anti-clockwise direction, roller 15 in clockwise direction again, roller 24 in anti-clockwise direction and roller 25 in clockwise direction, and so on.

Between the tension means 12 and the first roller 13 of the lower series, there will be noticed a roller 32, dipping into a pan 33, which is filled with a fabric treating agent for cleaning, eliminating streaks, and imparting uniform appearance to the goods, and further adapted to impart, together with the mechanical operation of the device, a natural appearing, improved finishing effect to the lower face of the material.

A similar device comprising a container 34 on top of frame 4, and having drip-cocks indicated at 35 provided, also contains an agent for treating the upper surface of the goods. It will be noted that the application of the agent takes place before the goods have reached their respective aprons.

Such agents as mentioned before, consist preferably of the following main ingredients, which may be changed according to the quality and structure of the goods to be treated. They are: waxes, aromatic aetheric oils, fatty acids and vegetable oils compounded in various proportions.

The material to be finished is placed in rolls upon the bearings in bracket 10 and are passed through tension means 12 over roller 32 and over roller 13 passing from there between the lower roller series and the upper apron, and then between the upper roller series and the lower apron.

Leaving the apron, the finished goods pass over the guide roller 7, and over guide roller 8 to the wind-up, indicated at 9.

The cloth is shown in the drawings in dashed and dotted lines, which can be readily followed.

The operation of my device is very simple. The lower surface of the cloth to be finished is supplied with the chemical agent from tank 33 and is drawn by roller 13 forward between the apron 23 and roller 14, which travels in opposite direction, and faster than the cloth. In this manner a certain finish is imparted to the cloth, at the point between the travelling apron 23 and roller 14. The apron 23 will give to a certain extent whereby a pressing contact is achieved between the roller and the cloth, which latter bears against apron 23.

Now the cloth travels over rollers 15 and 24 into the space between the upper series of rollers and the adjustable travelling apron 17, which latter on account of the considerable surface of its acting portion serves to draw the fabric through the machine.

The chemical agent contained in tank 34 is evenly distributed upon the right side of the cloth.

The material is now pressed between the upper series of rollers and the spaces between the apron supporting roller 18, 19 and 20.

Through the different direction of rotation of the upper series of rollers and through the pressure exerted against apron 17 by the upper frame in downward direction, a perfect surface contact between the rollers of the upper series and the upper face of the cloth supported by the travelling apron is accomplished.

Since there is a greater number of rollers in the upper series, the finish of the upper surface of the goods will be more complete than that of the lower surface.

As may be seen from the drawings, the lower apron is travelling at a slower speed than the rollers, due to the transmission arrangement, indicated at 36.

The material having passed over the apron and over roller 21 is guided over rollers 7 and 8 toward the wind-up indicated at 9.

By way of adjusting means 5, the adjustable frame 4 and therefore the pressure of the rollers against their respective aprons may be regulated.

From the above it will be noted that the finishing of the lower surface of the material is accomplished before the finishing of the upper surface of the material takes place; while this method has proven to be of great advantage in imparting a high grade finishing effect at the right side of the goods and a corresponding lesser finishing effect at its reverse side, due to the fact that the reverse side first receives the finishing treatment and that the chemical agent applied to that side has fully saturated it, and that the reverse side now serves so-to-speak as reinforcement for the finishing operation of the upper or right side, be it understood that the operation may be reversed or alternately employed, so that the first finished side serves as reinforcement for the successive operation of the other side to be finished. It is also possible to impregnate both sides simultaneously with the treating agent and then alternately apply the mechanical finishing treatments.

The principle of treating cloth or fabric material, alternately in opposite directions against yieldable supports, represents one of the important features of my device, whereby an exquisite finish is attained.

The mechanical construction of my finishing device may of course be changed and simplified in various ways, and I therefore reserve for myself the right to make improvements or changes intended to facilitate the operation of such a device to the best advantage attainable.

It is noted that the means 12, the roller 32 which applies the liquid treating agent to the fabric and the roller 13 are in such relative arrangement that the fabric is held by the means 12 and the roller 13 in tangent relation to the roller 32, so that it barely touches the periphery of the latter roller. This is a novel and important feature in my invention, because it is very necessary that a superfluous amount of the treating agent, which is usually of an oily nature, be not fed to the fabric or else the latter will be streaked or blotched. The roller 32 is not rotated, and the liquid agent reaches the goods over the surface of the roller only by capillary attraction.

Having thus described my invention, I claim:—

1. In a machine for imparting a natural appearing finish to a textile weave or similar material, the combination of a series of rollers adapted to alternately rotate in reverse directions and bear against the reverse surface of the material, a travelling apron disposed opposite said rollers and yieldably supporting the material at its future right surface, another series of rollers, having a greater number of rollers than the first series, adapted to alternately rotate in reverse directions and to bear against the right side of the material, a travelling adjustable apron disposed opposite said second series of rollers for yieldably supporting the material at its finished reverse side, means for adjusting the tension of said last apron, and means for supplying a chemical fabric treating agent to the respective surfaces of the material prior to being mechanically treated by said series of rollers.

2. In a cloth finishing machine, the combination of a stationary and an adjustable frame, a series of rollers adapted for mechanical treatment of the future reverse surface of a material lodged in the stationary frame, an adjustable travelling apron operatively mounted on said stationary frame, a travelling apron facing said series of rollers and operatively supported by said adjustable frame, another series of rollers also supported by said adjustable frame facing the adjustable apron, a driving mechanism for said rollers adapted to cause the rollers of the respective series to rotate alternately in clockwise and anti-clockwise directions, a take-up for said driving mechanism, means for supplying a chemical cloth treating agent to the material prior to being mechanically treated successively by the said series of rollers, and means for facilitating the regulating of said adjustable frame, and thus the pressure of the rollers against their respective travelling aprons.

3. In a cloth finishing machine, the combination of stationary and adjustable frames, a series of rollers, having resilient coverings, supported by said stationary frame, an adjustable travelling apron also supported by said stationary frame, a travelling apron facing the series of rollers and suspended by said adjustable frame, and so arranged as to allow its yieldable parts to be compressed by said rollers, another series of rollers, greater in number, having resilient coverings, suspended by said adjustable frame and facing said adjustable apron, said rollers being so arranged as to press against the yieldable portions of said apron, and means for facilitating the adjustment of the pressure between said series of rollers and their respective aprons.

4. In a fabric rubbing machine, the combination of coacting rubbing means between which the fabric is held and adapted to be advanced under pressure, one including an apron and spaced supports bridged by a part of the apron and the other being arranged to exert pressure on the apron between such supports, and carrying structures for said means, respectively, one of said structures being adjustable in a path extending through a plane connecting said supports to move the corresponding means toward and from the other.

5. In a fabric rubbing machine, the combination of a fabric rubbing roller member, means to support said member in position to rub one face of the fabric, an apron member arranged to bear against the opposite face of the fabric, means for supporting and also maintaining taut the apron member independently of the other member including spaced supports for the apron member by which the fabric-contacting portion thereof is bridged and arranged on the relatively opposite sides of the roller member, the fabric being adapted to be advanced transversely of the axis of the roller member and between said members, and means to move one member in rubbing contact with the fabric.

6. In a fabric rubbing machine, the combination of an apron advanceable in its own plane, means to hold taut a part of the length of the apron, and supports for said part spaced from each other lengthwise of and engaging one face of said part, the other face of said part being adapted to frictionally grip one face of and thereby advance the fabric, a plurality of rubbing rollers having their axes transverse of the path of advance of the apron and bearing against the opposite face of the fabric between said supports, and means to revolve the rollers in relatively opposite directions.

7. In a fabric rubbing machine, the combination of an apron advanceable in its own plane, means to hold taut a part of the length of the apron, and supports for said part spaced from each other lengthwise of and engaging one face of said part, the other face of said part being adapted to frictionally grip one face of and thereby advance the fabric, a plurality of rubbing rollers having their axes transverse of the path of advance of the apron and bearing against the opposite face of the fabric between said supports, and means to revolve the rollers in relatively opposite directions and simultaneously advance the apron.

8. In a fabric rubbing machine, the combination of two sets of fabric rubbing rollers arranged to rub opposite faces of the fabric while being advanced and one set in advance of the other relatively to the direction of such advance, the axes of all the rollers being transverse of the path of advance of the fabric, means, common to the rollers in both sets, to rotate the rollers in each set in relatively opposite directions, and means to hold the fabric bearing against each set of rollers while being advanced.

9. In a fabric rubbing machine, the combination of two sets of fabric rubbing rollers arranged to rub opposite faces of the fabric while being advanced and one set in advance of the other relatively to the direction of such advance, the axes of all the rollers being transverse of the path of advance of the fabric, means, including a travelling belt extending zig-zag fashion around and in contact with the rollers of both sets, to rotate the rollers in each set in relatively opposite directions, and means to hold the fabric bearing against each set of rollers while being advanced.

10. In a fabric rubbing machine, the combination of an apron, means supporting and also maintaining taut the apron including a series of supports for the apron arranged all against one face of the apron and substantially in a plane and with spaces intervening between them, the fabric being advanceable in contact with the opposite face of the apron and past the several supports successively, and rubbing members arranged to bear in unison against the portion of the fabric in contact with the taut part of the apron and also arranged respectively opposite said spaces.

11. In a fabric rubbing machine, the combination of two sets of coactive fabric pressing means, each set including a roller and an opposer therefor, supporting structures movable one toward and from the other and one carrying at one side of the fabric the opposer of one and the roller of the other set and the other carrying at the other side of the fabric the other roller and opposer, a driving belt extending around and adapted to rotate the rollers and yielding means to tension the belt.

PAUL EDLICH.